(12) United States Patent
Xie et al.

(10) Patent No.: US 7,337,148 B2
(45) Date of Patent: Feb. 26, 2008

(54) ENHANCED SECURITY AND PROCESSING FOR WEB SERVICE BUSINESS TRANSACTIONS

(75) Inventors: Nan Xie, San Mateo, CA (US); Vebhhav Singh, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 629 days.

(21) Appl. No.: 10/691,149

(22) Filed: Oct. 21, 2003

(65) Prior Publication Data

US 2005/0086178 A1    Apr. 21, 2005

(51) Int. Cl.
*G06Q 99/00* (2006.01)
(52) U.S. Cl. .......................... 705/80; 705/1
(58) Field of Classification Search ............... 705/80, 705/1
See application file for complete search history.

(56) References Cited

U.S. PATENT DOCUMENTS

| | | | | |
|---|---|---|---|---|
| 2004/0064351 | A1* | 4/2004 | Mikurak | 705/7 |
| 2005/0086178 | A1* | 4/2005 | Xie et al. | 705/80 |
| 2007/0005478 | A1* | 1/2007 | Lambe | 705/35 |

FOREIGN PATENT DOCUMENTS

JP    2003076848    *    3/2003

OTHER PUBLICATIONS

UN/CEFACT and OASIS, "ebXML, Requirements Specification, v1.06," Requirements Team, May 11, 2001, pp. 1-40.
UN/CEFACT and OASIS, "ebXML, Message Service Specification, v1.0," Transport, Routing & Packaging Team, May 11, 2001, pp. 1-107.
UN/CEFACT and OASIS, "ebXML, Business Process Specification Schema, v1.01," Business Process Team, May 11, 2001, pp. 1-141.
OASIS Open, "Web Services Security: SOAP Message Security 1.0," Jan. 19, 2004, pp. 1-56.
Kuassi Mensah, et al., Oracle Corporation, "Database Web Services," An Oracle White Paper, Nov. 2002, pp. 1-21.

(Continued)

*Primary Examiner*—Pierre Eddy Elisca
(74) *Attorney, Agent, or Firm*—Hickman Palermo Truong & Becker LLP

(57) ABSTRACT

A technique is described in which a web service provider is able to specify that messages related to business transactions with the web service includes trading partner information. For example, a provider may specify such requirements in a WSDL description of the relevant web service and may register the description with a UDDI registry. The trading partner information is regarding business transactions between the requesting party and the provider and is related to pre-established trading partner relationships and associated agreements and processes. Such trading partner information typically includes information that identifies, for example, the requesting party and the type of transaction. Consequently, the provider can determine whether the received request originates from an established trading partner and whether the requesting party is entitled to conduct the requested business transaction. Hence, application-level security is provided to electronic business transactions. Furthermore, enhanced processing of the business transaction results from being able to access, based on the received trading partner information, more elaborate data models associated with electronic transaction processes established between the trading partners.

40 Claims, 3 Drawing Sheets

OTHER PUBLICATIONS

David Wrightson, Oracle Corporation, "Understanding the Oracle Transport Agent Messaging Protocol," An Oracle White Paper, Jul. 2001, pp. 2-11.

Oracle Corporation, "Oracle9iAS Integration Release 9.0.4 Data Sheet," Nov. 1, 2002, pp. 1-5.

Oracle Corporation, "Oracle9i Application Developer's Guide—XML, Release 1 (9.0.1)," Part No. A88894-01, Ch. 17: Introducing Oracle XML Gateway, 9 pages.

OASIS, "Trading Partner Agreement Markup Language (tpaML)," Jan. 31, 2000, http://xml.coverpages.org/tpa.html, 5 pages.

Martin Sachs, et al., IBM Corporation, "Executable Trading-Partner Agreements in Electronic Commerce," 2000, pp. 1-22.

Martin Sachs, et al., IBM Corporation, "Electronic Trading-Partner Agreement for E-Commerce, (tpaML)," Pre-submission Draft, Version: 1.0.3, 2000, pp. 1-86.

XML/EDI Group, "Guidelines for using XML for Electronic Data Interchange," Version 0.05, Jan. 25, 1998, http://www.geocities.com/WallStreet/Floor/5815/guide.htm, data retrieved Feb. 12, 2004, pp. 1-29.

* cited by examiner

ENHANCED SECURITY AND PROCESSING FOR WEB SERVICE BUSINESS TRANSACTIONS

FIELD OF THE INVENTION

The present invention relates generally to web services and, more specifically, to techniques for enhancing the security and processing of web service business transactions.

BACKGROUND OF THE INVENTION

Services provided over the Internet, commonly referred to as web services or application services, are evolving. Likewise, technologies that facilitate such services are also evolving. A web service can be defined as any information sources or business processes that are conveniently made available for use by an application or end-user. Web services typically include some combination of programming and data that are made available from an application server for end users and other network-connected application programs.

Activities focusing on defining and standardizing the use of web services include the development of Web Services Description Language (WSDL). WSDL is an Extensible Markup Language (XML) format for describing web services as a set of endpoints operating on messages containing either document-oriented or procedure-oriented information. The operations and messages associated with a web service are described abstractly using WSDL, and then bound to a particular network protocol and message format to define an endpoint. Related endpoints may be combined into an abstract collection of endpoints to define a particular web service. A document described as Version 1.1 of Web Services Description Language is available from the World Wide Web Consortium (W3C). WSDL 1.1 is incorporated by reference in its entirety for all purposes as if fully set forth herein.

Descriptions of web services are commonly published in Universal Description, Discovery, and Integration (UDDI) registries, from which they are available for metadata querying, retrieval and interpretation by a potential user or requester of a given web service. A collection of documents described as UDDI Version 3 Specification is available from the OASIS (Organization for the Advancement of Structured Information Standards) UDDI Specifications Technical Committee. The collection of documents is currently described as including (1) UDDI Version 3.0 Features List; (2) UDDI Version 3.0; (3) UDDI Version 3.0 XML Schema; (4) UDDI Version 3.0 WSDL Service Interface Descriptions; all of which are incorporated by reference in their entirety for all purposes as if fully set forth herein. UDDI Version 3.0 provides a specification for building flexible, interoperable XML Web services registries that are useful in private as well as public deployments of web services, and offers clients and application developers a comprehensive and complete blueprint of a description and discovery foundation for a diverse set of Web services architectures.

Web services are increasingly becoming the means through which business enterprises interoperate, such as in the context of business-to-business (B2B) transactions. The prominence of security issues with respect to web services increases as more business transactions utilize such technology. One approach to securing web service exchanges is the use of Web Services Security (WSS), which is currently described in "Web Services Security: SOAP Message Security" available from the OASIS Web Services Security Technical Committee. With the WSS approach, enhancements to SOAP messaging are employed to provide quality of protection through message integrity and single message authentication. Further, the WSS approach provides a general-purpose mechanism for associating security tokens with messages. However, the WSS approach has shortcomings with respect to use with legacy business-transaction applications that were not designed to communicate with modern-day web services and the associated level of security provided to such transactions. Examples of such shortcomings are described below.

Based on the foregoing, there is a general need for enhanced security and processing with web service business transactions. There is a specific need for enhanced security with web service business transactions that involve legacy and proprietary systems.

Trading Partners

Many legacy applications and systems currently used in facilitating business-to-business transactions do not protect communications associated with web service transactions (such communications are referred to herein as "exchanges") simply with security validations and tokens alone. Rather, such legacy applications may also protect and enhance communications at the transport layer and tailor processing by participating end systems by using prior customized setup procedures that are pertinent to business transactions between "trading partners". For example, trading partners typically form legal, procedural and other agreements that govern web service business transactions among such partners. However, the WSS approach to securing web service exchanges is silent with respect to the notion of trading partners and the associated agreements and governance that the agreements provide.

Various parties have notions of how trading partner relationships are defined and the associated significance of trading partners. However, known efforts in the area of trading partners are directed at facilitating trading partner establishment, such as setup and exchange of information associated with trading partner agreements, rather than directed at enhancing web service business transactions at transaction-time. For example, tpaML (Trading Partner Agreement Markup Language) uses XML to define and implement electronic contracts. The foundation of tpaML is the Trading Partner Agreement (TPA), which defines how trading partners will interact at the transport, document exchange and business protocol layers. A TPA contains the general contract terms and conditions, participant roles (buyers, sellers), communication and security protocols and business processes, (valid actions, sequencing rules, etc.). XML-based TPA documents capture the essential information upon which trading partners must agree in order for their applications and business processes to communicate.

tpaML is a complementary technology to the ebXML (the Electronic Business XML) initiative, which is a global initiative to develop an open technical framework to enable XML to be utilized in a consistent and uniform manner for the exchange of all electronic business data. ebXML is a modular suite of specifications that enables enterprises of any size and in any geographical location to conduct business over the Internet. Using ebXML, companies now have a standard method to exchange business messages, conduct trading relationships, communicate data in common terms and define and register business processes. In the past, the technology available for most businesses to exchange data was electronic data interchange (EDI). The scope of the focus of ebXML is business transactions in general; not necessarily modern-day web service-specific business transactions, such as with web services that are described in WSDL.

Based on the foregoing, there is a need for assistance with the migration of legacy and proprietary applications so that they can interact efficiently with modern-day Web Services in the context of business transactions over a network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
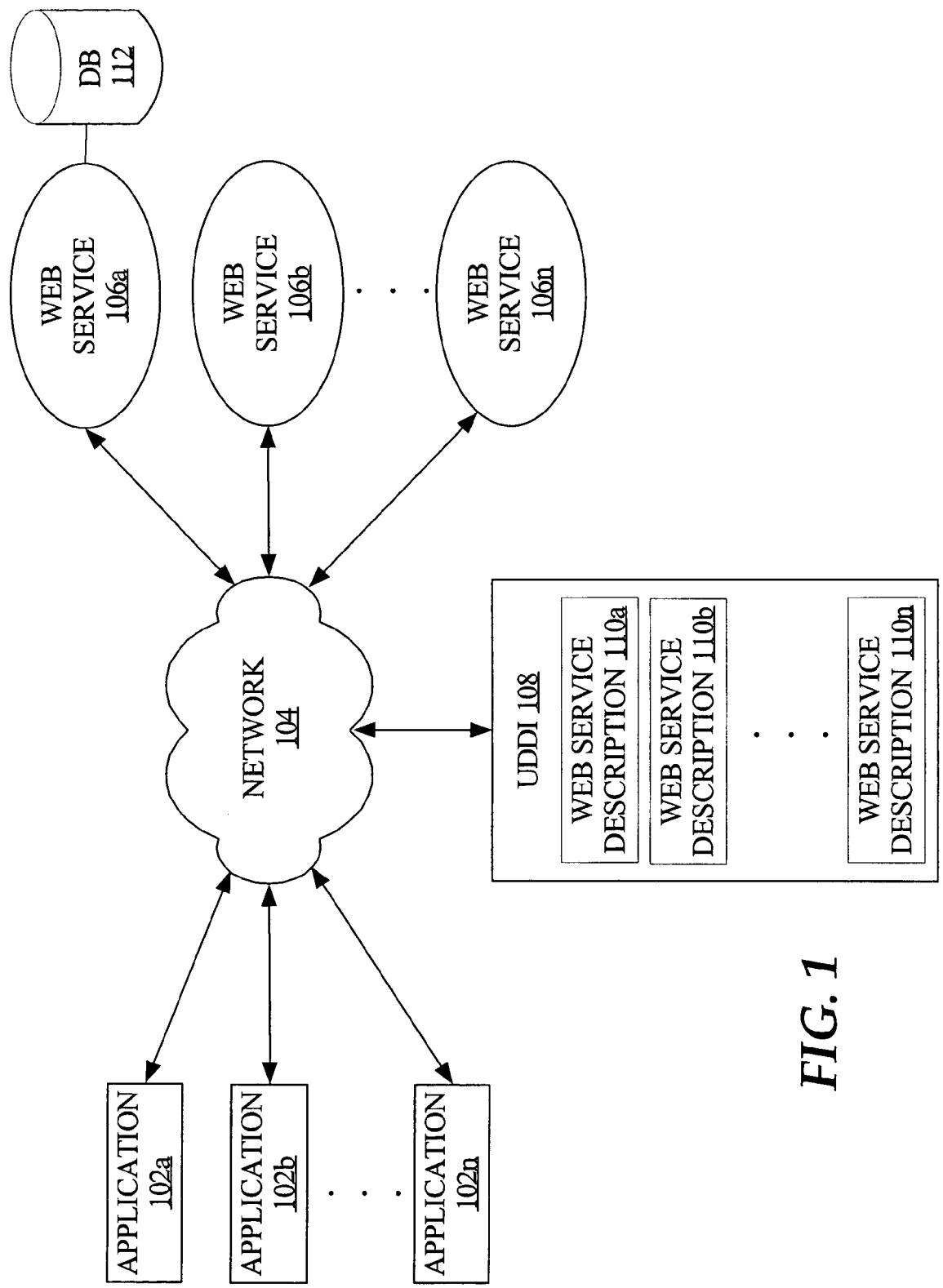
FIG. 1 is a block diagram that illustrates an operating environment in which embodiments of the invention may be implemented.

Techniques are described herein for enhanced security and processing of web service business transactions. More specifically, techniques are described for integration and use of trading partner information in web service exchanges as part of the actual exchange of messages that constitute a transaction between two or more parties, such as SOAP messages.

Integrating the notion of trading partners directly into web service messages and, therefore, utilizing related and pre-established information about such trading partners in the transaction process, provides additional confidence in the security of related exchanges due to the underlying trading partner infrastructure, as well as generally enhances the transaction process. This is especially true with respect to legacy applications, which typically benefit from the existence of predefined agreements and processes related to business transactions that transpire using such legacy applications. In general, including trading partner information in electronic business transactions provides a notion of who the requesting party is, the requesting party's contact information, and transaction-governing processes or procedures for interaction between the parties to the transaction or the parties' respective software applications.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

According to one aspect, a technique is described in which a web service provider is able to specify that messages related to business transactions with the web service include trading partner information. For example, a provider may specify such requirements in a WSDL description of the relevant web service. The trading partner information includes an identification of the party that is requesting the web service ("requesting party") as a trading partner of the web service provider, and the trading partner information is regarding business transactions between the requesting and providing parties.

The trading partner information provided to the web service by way of the request is typically related to pre-established trading partner relationships and associated agreements and processes. Such trading partner information typically includes information that identifies, for example, the requesting party and the type of transaction. Consequently, a party that receives the request can authenticate the sender by determining, based on the trading partner information, whether the received request and associated data parameters or attributes originate from an established trading partner, and whether the sender is entitled to execute such a request. The foregoing actions are often referred to as authentication and authorization, respectively. Hence, application-level security is provided to on-line business transactions through use of techniques described herein.

Therefore, according to one aspect, the provider receives a request for a web service transaction that includes such trading partner information as specified in the web service description. For example, a series of SOAP messages are received by the web service provider, which include trading partner information from the requesting party. Based on such information, the provider (1) can determine whether the requesting party is an established trading partner, i.e., authenticate the requesting party, and (2) proceed to determine whether the requesting party is entitled to do certain things, such as execute the requested business transaction, i.e., authorize the requesting party. If the requesting party is an established trading partner, then information about the requesting party can be accessed based on the trading partner information provided in the transaction messages. For example, information about what data regarding the provider and/or provider's products and pricing the requesting party has access to, what process a purchase transaction should adhere to, the status of shipment, and the like, may be available and pertinent to the transaction at hand. Therefore, the provider can service the web service transaction request according to the predetermined agreements and processes.

Operating Environment

FIG. 1 is a block diagram that illustrates an operating environment in which embodiments of the invention may be implemented. The illustrated operating environment includes applications 102a, 102b-102n, which communicate through a network 104 to any of multiple web services 106a, 106b-106n.

Applications 102a, 102b-102n are client software applications that each include one or more sequences of instructions that are executable by one or more processors. For example, applications 102a, 102b-102n are programs that are executable on a computer system such as the system illustrated in FIG. 3. There is no necessary relationship or similarity between applications 102a, 102b-102n, unless otherwise described herein. Each of the applications 102a, 102b-102n is capable of outputting requests for information or services, with associated data. Such requests can be sent to a web service 106a, 106b-106n to perform business transactions, such as those commonly referred to as business-to-business (B2B) transactions. Such requests can take the form of SOAP messages.

In addition, client-side applications 102a, 102b-102n store relevant trading partner information associated with established trading partners, which contains pre-established trading partner setup information that the application can include in outbound communications at runtime.

Any of applications 102a, 102b-102n may be a "legacy application", as in an embodiment. The term "legacy application" is used herein in reference to applications that were not designed to communicate with modern-day web services, such as those commonly defined in WSDL and implemented over a communications network such as the public Internet.

Legacy and other proprietary business transaction applications and systems in B2B transactions can benefit greatly by the techniques described herein, through the use of predefined trading partner information in exchanges associated with a given transaction. However, use of these techniques is not limited to legacy and proprietary applications and systems because newly developed business applications, which function as a requesting application 102a-102n or as a web service 106a-106n, also benefit from enhanced SOAP or other messaging that includes information about the requesting party and requested transaction type. The additional information included in the message can then be used by the provider to index into more complex data structures that are associated with business transactions, such as data access policies, processing requirements, and the like.

Web services 106a, 106b-106n typically include some combination of programming and data that are made available from a web server or application server for end users and other network-connected application programs. There is no necessary relationship or similarity between web services 106a, 106b-106n, unless otherwise described herein. Each of the web services 106a, 106b-106n is capable of receiving requests that include some form of trading partner information.

Web services 106a, 106b-106n are capable of being described or specified in a web service description. For example, web services have characteristics that are commonly described in WSDL and that are published in or registered with a repository, such as UDDI 108. Web Services Description Language (WSDL) 1.1 is available from the WC3 (World Wide Web Consortium) and UDDI Version 3.0 is available as an OASIS Committee Specification from the UDDI.org organization, both of which are incorporated by reference in their entirety for all purposes as if fully disclosed herein.

A web service, such as any of web services 106a, 106b-106n, is optionally coupled to a database 112. Database 112 is any conventional data repository for storing, managing and retrieving data. Database 112 may be external to a given web service application or system, or may be internal to the web service application or system. Therefore, a database server application may be a component of a given web service application, or may reside on a separate machine and expose APIs for interactions between a web service application and the database server. A web service provider may use a single database 112 to serve multiple web service applications or use separate databases 112 for each web service application.

Database 112 serves as the data storage and retrieval mechanism for a web service. Therefore, database 112 is configured to store, manage and retrieve information about established trading partner agreements, policies, processes, and the like. The type of data storage may vary from implementation to implementation and, therefore, is not limited to a database. Rather, trading partner information may be stored in any suitable device or system. The trading partner information that is included in a business transaction message, pursuant to the specification associated with a given web service, operates as an index or pointer to the established agreements, policies, processes, etc. that are stored in database 112.

UDDI 108 includes one or more web service descriptions 110a, 110b-110n. Each web service description describes characteristics of a web service, such as web services 102a, 102b-102n. Included in those characteristics are requirements for invoking a given web service, such as the required input information, format, invocation procedure, encoding scheme, and the like. According to an aspect of the invention, a web service description, such as web service description 110a, that is associated with a web service, such as web service 106a, explicitly specifies that at least one communication to the given web service should include trading partner information. Further, the structure of the trading partner information that is required in communications to the web service may be defined in the associated web service description.

Applications 102a, 102b-102n and web services 106a, 106b-106n communicate through a communications network 104. Network 104 may contain any number of network infrastructure elements including routers, switches, gateways, etc. For example, network 104 may be the public Internet or a private LAN. In one embodiment, the network is a TCP/IP network in which infrastructure elements execute a conventional routing protocol for routing packets among the infrastructure elements. Although embodiments are described herein with reference to the TCP/IP protocols, implementations are not limited to use of TCP/IP. Rather, other network communication protocols, including protocols that are not yet developed, may be used to implement these techniques.

Trading Partner Information

The specific content of trading partner information required by a web service provider may vary from implementation to implementation. Since there is no widely accepted standard defining what trading partner information includes, and each group of trading partners can define what is believed to be important in conducting business transactions over a network, the trading partner information specified in a given web service description and received by a given web service is essentially unlimited.

In one implementation or embodiment, the following trading partner information is specified to be included in one or more communications or exchanges associated with a given transaction. The data items presented below can be implemented, for example, as XML elements in an XML document, and/or in SOAP message headers. Furthermore, the data items may be global or local in nature, where they may apply, respectively, to every participating party and transaction or only to two participating parties and their associated transactions, for example. As discussed above, trading partner information may vary from implementation to implementation, hence, the following is presented for purposes of non-limiting examples.

PARTY_ID: identifies the requesting trading partner.

PARTY_SITE_ID: identifies the physical location, e.g., a mailing address, of the requesting trading partner. For example, an address registered with the state of incorporation of the requesting party, which is the address for legal service processing, may be provided in this field. Alternatively, an identification or indexing mechanism to locate the address in a data repository may be included in this field. The PARTY_SITE_ID field functions as a finer distinguisher of the requesting trading partner in comparison to the PARTY_ID field. Different physical locations associated with the requesting trading partner, e.g., different divisions of a corporation or enterprise, may establish different policies and procedures with respect to on-line business transactions. Therefore, such site-specific distinctions can be distinguished through use of the PARTY_SITE_ID information.

PARTY_TYPE: identifies the characterization of the requesting trading partner, e.g., a customer, a bank, a supplier. Different types of trading partners, e.g., business entities that operate in different business industries, that provide different products or services or that assume different positions in a transaction, may establish different policies and procedures with respect to on-line business transactions. Therefore, such party-type-specific distinctions can be distinguished through use of the PARTY_TYPE information. Furthermore, what type a requesting trading partner is characterized as may affect where and how information is stored internal to the web service application or system. For example, an enterprise resource planning system may treat customers and suppliers as separate sub-systems, which may maintain trading partner information in different manners.

TRANSACTION_TYPE: identifies the type of transaction that the requesting trading partner is requesting. Business transactions associated with different transaction types are typically governed by different policies and procedures. For example, a transaction that is characterized as "purchase steel" may be governed by a procedure that includes separate actions (which may each be treated as a separate transaction by the parties) such as (a) query inventory (by purchaser), (b) submit purchase order (by purchaser), (c) confirm order (by supplier), (d) send shipment notice (by supplier). Thus, providing information in the TRANSACTION_TYPE field helps identify the type of transaction requested and, therefore, identifies a set of policies or a process that is to be used to govern an electronic business transaction over a network.

TRANSACTION-SUBTYPE: identifies an action within a larger set of transactions associated with an on-line business transaction. For non-limiting examples, transaction sub-types may include "create", "change" and "cancel". Again, parties to the transaction may perform different actions or processes depending on what transaction sub-type is requested, and specification of such information helps to identify the relevant action and/or process for the given transaction sub-type.

Generally, the foregoing elements are used to point to more elaborate data models that are stored and accessible by the web service provider or a suitable proxy or intermediary.

Given peculiarities existing among various vendors' trading partner implementations, a mechanism is provided for differentiating among various vendors and associated trading partner protocols. In an embodiment, namespaces (an XML concept) are used to differentiate between vendor specifications and, therefore, to distinguish the context of the trading partner information. For example, if multiple parties use the same attribute value for the PARTY_SITE_ID, then the namespace attribute can be used to distinguish, to the web service provider (receiver of the message), among the multiple parties that use the same attribute value.

Furthermore, additional information may be requested for on-line business transaction messages. In an embodiment, application-level USER_NAME and PASSWORD are required in a message to the web service application. Hence, this information can be used to authenticate the requesting party and the requesting party's authority to interact with the web service application.

Process for Conducting a Business Transaction Over a Network

Figure 2:
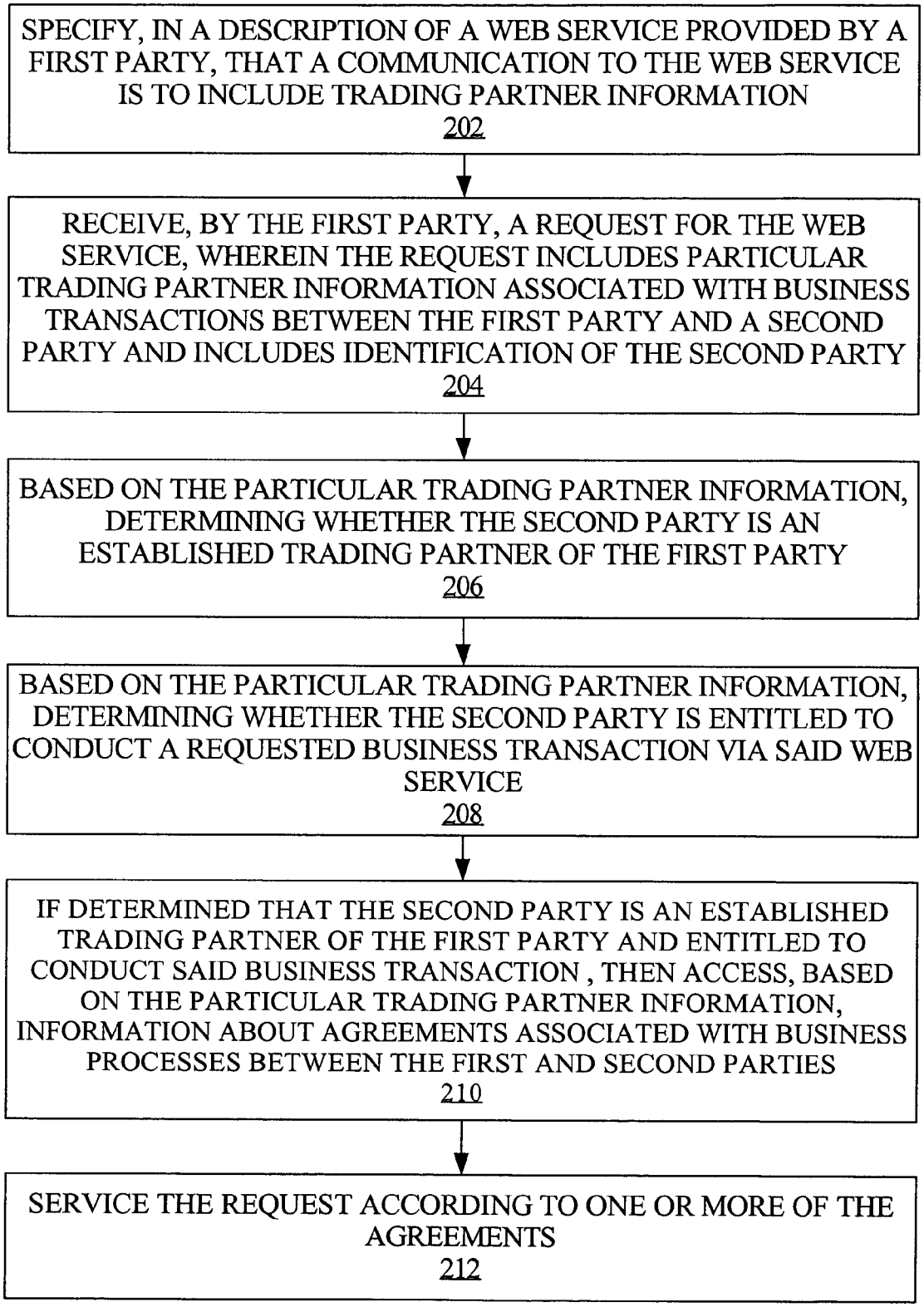
FIG. 2 is a flow diagram that illustrates a process for conducting a business transaction over a network.

FIG. 2 is a flow diagram that illustrates a process for conducting a business transaction over a network. The process of FIG. 2 is performed by a web service provider, such as providers of web services 106a, 106b-106n.

At block 202, a description of a web service is provided by a first party (e.g., a web service provider, referred to as "provider"), which specifies that at least one communication sent to the web service is to include trading partner information. For example, a description of web service 106a that is characterized in WSDL and registered with UDDI 108 in association with web service 106a, specifies that certain trading partner information should be included, in accordance with a specified structure, in invocation messages to web service 106a. The certain trading partner information specified may include, for a non-limiting example, the elements listed above, which are PARTY_ID, PARTY_SITE_ID, PARTY_TYPE, TRANSACTION_TYPE, TRANSACTION-SUBTYPE, and USER_NAME and PASSWORD.

Within the web service description is a section defining types, including message header types. This header type definition section typically defines the header structure as some sort of XML schema type. In one scenario, the XML schema is defined off-line in another location, such as in an XSD stored on a remote or local server or database. In this scenario, the XML schema is imported by a requester of the web service based on a link specified in the web service description. In another scenario, the XML schema is defined in-line in the web service description in a schema format. In either scenario, the required trading partner information and fields are included as part of this XML schema type definition.

Any application or end-user that wants to interact with web service 106a to conduct a business transaction or process can retrieve the description from UDDI 108 and "digest" the description. For example, a user can query metadata to identify relevant available web services and associated descriptions, and can retrieve, parse and interpret descriptions. From a description, one can determine what requirements are associated with messages, for example, in what XML tags to embed the requested information in XML messages encoded in accordance with SOAP, that are transmitted to invoke or cause further processing by web service 106a. SOAP messaging is not a requirement of the techniques described herein, but is used for purposes of example because universal use of SOAP messaging is currently widely anticipated. However, other communication schemes may be used to invoke a given web service, depending on the web service's specified description and requirements.

At block 204, the provider receives a request for the web service. The request includes particular trading partner information about a second party, e.g., the requesting party. The included trading partner information is associated with business transactions between the provider and the requesting party. For example, the received information may be in the form of XML element attributes that can be used by the provider to retrieve more complex information about the requesting party, which may include policies and/or processes that govern electronic transactions between the two parties. Furthermore, the received information includes some information that identifies the requesting party. As described in reference to block 202, a SOAP message received by the provider from the requesting party or some suitable proxy may include values for the elements listed above.

The particular format of a message that includes specified trading partner information and that is sent from a requesting party to a web service may vary from implementation to implementation. However, an example of a message format for a message sent to the web service, which includes particular trading partner information, is as follows.

the web service description, such as the description described in reference to block 202. Thus, if the requesting party is not already an established trading partner, then the requesting party can refer to the web service description that is registered in UDDI, for example, to determine what to do to become a trading partner of the web service provider.

```
<SOAP-ENV:Envelope xmlns:SOAP-ENV="http://schemas.xmlsoap.org/soap/envelope/"
xmlns:xsd="http://www.w3.org/2001/XMLSchema"
xmlns:xsi="http://www.w3.org/2001/XMLSchema-instance">
<SOAP-ENV:Header>
    <WFWSHeader xmlns="http://www.oracle.com/oracle/apps/fnd/wf/ws">
    <TRANSACTION_TYPE>ECX_OUT_XIE</TRANSACTION_TYPE>
    <PROTOCOL_TYPE>SOAP</PROTOCOL_TYPE>
    <MESSAGE_TYPE>XML</MESSAGE_TYPE>
    <PARTY_TYPE>S</PARTY_TYPE>
    <PARTYID>PARTNER_PARTY_ID</PARTYID>
    <PARTY_SITE_ID>PARTNER_PARTY_SITE_ID</PARTY_SITE_ID>
    <USERNAME>PARTNER_USERNAME</USERNAME>
    <PASSWORD>_!0#9649@#9 `+^#$}@|%9BA}A^}0</PASSWORD>
    <#MSG_ID>C7B31E4049A40F68E030B98B537F3731</#MSG_ID>
    <DOCUMENT_NUMBER>DirectOutExpansion_CC</DOCUMENT_NUMBER>
    <MESSAGE_STANDARD>OAG</MESSAGE_STANDARD>
    <WS_CONSUMER>ecx</WS_CONSUMER>
    <TRANSACTION_SUBTYPE>ECX_OUT_XIE</TRANSACTION_SUBTYPE>
    <ATTRIBUTE1>PARTNER_ATTR1</ATTRIBUTE1>
    . . .
    </WFWSHeader>
</SOAP-ENV:Header>
<SOAP-ENV:Body>
<receiveDocument xmlns="urn:defaultSoapMessaging">
. . .
</receiveDocument>
</SOAP-ENV:Body>
</SOAP-ENV:Envelope>
```

The PARTY_TYPE, PARTYID, PARTY_SITE_ID, USERNAME, and PASSWORD tags represent the trading partner information that is specified, by the web service provider, to be included in communications to the web service. The "xmlns" information is namespace information that is used to further qualify the header. This information can be used to relate a specialized name for the header, such as "WFWSHeader", to a particular namespace that is associated with the web service provider, or can be used to further associate the trading partner information with a particular namespace that is associated with the web service provider.

At block 206, in an embodiment, the provider determines whether the requesting party is an established trading partner, based on at least a portion of the particular trading partner information that was received at block 204. Block 206 may be referred to as an authentication process. For example, after security validation (e.g., authentication and authorization), the provider may access a table from database 112, index into the table using the value in the PARTY_ID element of an XML document encoded as a SOAP message, and verify whether a valid trading partner relationship exists with the requesting party based on information in the table. At this point in the transaction, a provider can at least determine whether the request is from a known source and whether there are pre-existing agreements with that source. Furthermore, additional requesting-party-associated fields, such as PARTY_SITE_ID and PARTY_TYPE, are useable to further verify that the source of the message is who it claims to be. Hence, application-level security is provided regarding the electronic web service transaction.

In an embodiment, requirements regarding a process to become a trading partner with the provider are included in Such a partnership could then be established off-line according to the specified process, independent of the attempted transaction, and the transaction with the web service subsequently reattempted.

In an embodiment, an optional block 208 is performed, where the provider determines whether the requesting party is entitled to conduct the requested business transaction with the web service, based on at least a portion of the particular trading partner information that was received at block 204. Block 208 may be referred to as an authorization process. Hence, application-level security is provided regarding the electronic web service transaction.

In an embodiment, if it is determined at block 206 that the requesting party is an established trading partner of the provider, then at block 210, information about agreements associated with business processes between the provider and the requesting party is accessed. Again, the provider may access a table from database 112 and index into the table using the values for element attributes provided in the request or other messages to the provider, to access the pre-established policies and/or processes that have been agreed upon to govern such transactions between the parties. This portion of the process, through the actual real-time exchanges between the parties, greatly enhances the overall electronic transaction process by providing a means for using more complex information that is associated with partnership agreements between the parties.

However, in an alternate embodiment, the requesting party is determined to be an established trading partner, block 206, and is determined to be entitled to conduct the requested transaction, block 208, before information about agreements associated with business processes between the provider and the requesting party is accessed at block 210.

At block 212, the provider services the request received at block 204, according to one or more of the agreements that were accessed at block 210. For example, if the provider, in accordance with the pre-established transaction process, needs to respond to an authorized attempt to access the provider's inventory information, or to open a specific port for accepting purchase orders, or to send a purchase confirmation in response to receiving a purchase order, then the provider will perform such action as is necessary. Benefits of being a party to pre-established policies and processes are recognized and enjoyed by both participating parties at transaction-time, foregoing the need for additional exchanges at transaction-time that might be needed to present and agree to policies and processes for governing the transaction. Consequently, a more efficient and smoother transaction occurs through use of the pre-established trading partner information than would occur without such information.

From the perspective of the requesting party, a related process includes (1) accessing a web service description that is provided by the web service provider and that includes a specification that trading partner information be included in at least one communication to the web service; (2) determining from the description that a communication should include the specified trading partner information; (3) constructing a message, based on the description, to the web service, wherein the message includes the specified trading partner information; and (4) transmitting the message to the web service or a suitable proxy.

Overview of an Application of an Embodiment

An end-to-end example of a functional application of an embodiment of the invention, with respect to Party A requesting to purchase steel from a web service provider Party B, is as follows.

Prior to application of the embodiment, Parties A and B establish one or more trading partner agreements associated with an on-line business transaction process for purchasing steel. For a non-limiting example, part of the customized purchasing process may include steps that are performed by Party A and which are authorized by Party B, such as on-line accessing of Party B's inventory and a particular price list that may be tailored to Party A (e.g., it includes certain discounts that Party B offers Party A). This establishment process may be performed "manually" or through some suitable mechanism, such as tpaML. At runtime, the pre-established steel purchasing process is followed through utilization of the embodiment, which provides encryption at the transport layer, application-level authentication and authorization, and the ability to implement pre-established customized business logic regarding the purchasing process.

Party B specifies particular trading partner information that messages to the web service should include. For example, Party B defines, in a WSDL description, the XML schema header type and specifies the associated XML schema for the header. Further, Party B publishes this WSDL description to the public. The description may include, for example, the required messaging type, encoding type, encryption type, and trading partner attributes that communications with the web service should adhere to.

At runtime, that is when Party A initiates the pre-established on-line purchasing process, Party A sends a message to Party B in the format and with the content in accordance with the web service description published by Party B. Upon receipt of the message, Party B parses and decrypts the message and communicates the associated information to the web service application layer, where the header is inspected, Party A is authenticated and authorized, and the attributes associated with the request are stored.

At some point, the application layer retrieves the stored information which is, for example, stored in XML format, and includes the required trading partner information. Party B may then look-up, based on the trading partner information, a more complex data structure or schema that is associated with on-line web service business transactions with Party A. Parties A and B proceed with processing the on-line web service business transaction according to the pre-established agreements.

Hardware Overview

Figure 3:
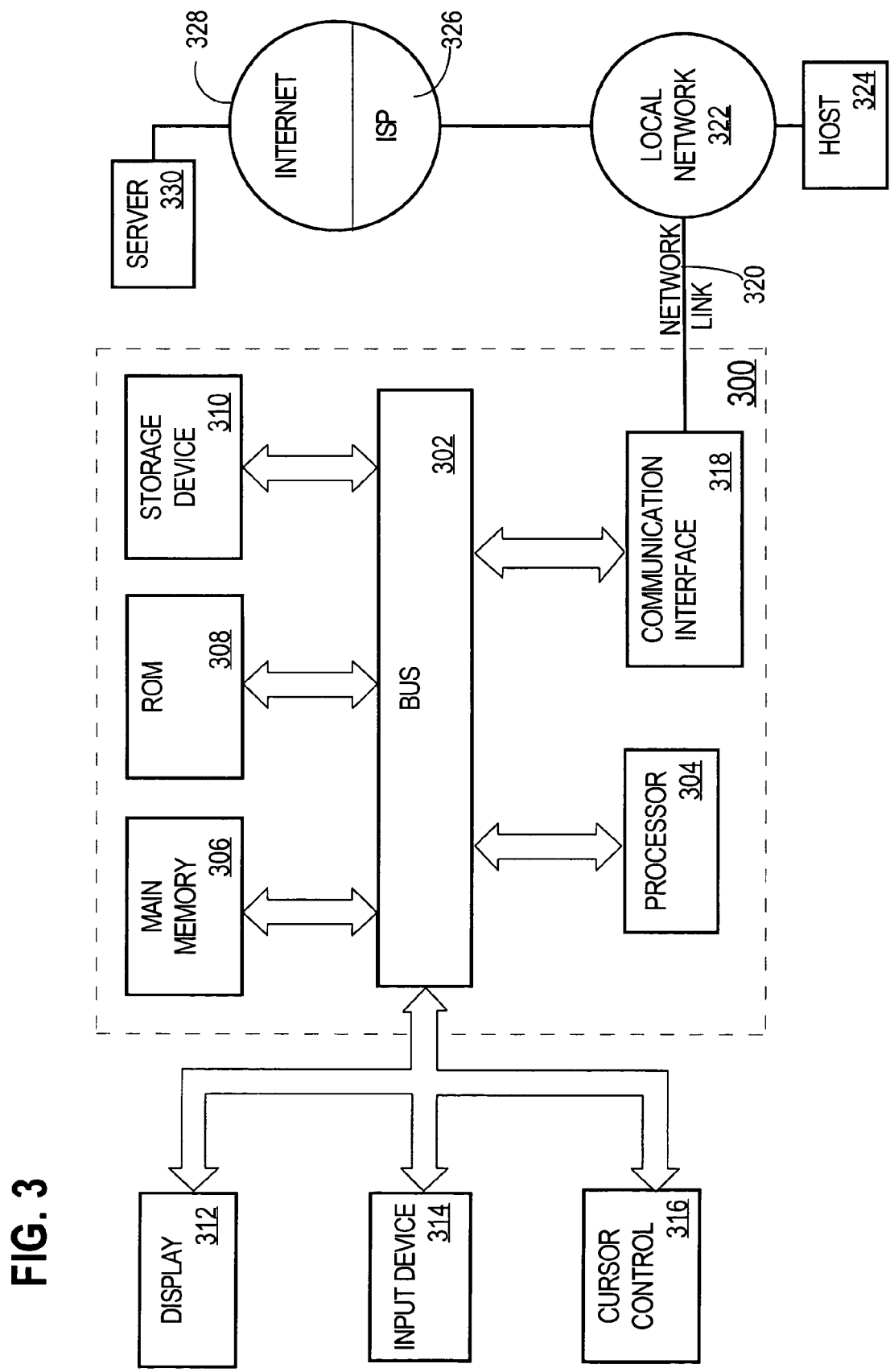
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

For example, reference is made to the currently common method of describing and publishing web services using WSDL and UDDI. However, as the development and description procedures and standards of web services evolve, the techniques described herein are applicable to other computer languages, procedures and standards that are associated with web services and which are not currently known. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for conducting a business transaction over a network, the method comprising the computer-implemented steps of:

specifying, in a publicly-available description of a web service that is provided by a first party, that at least some communications to said web service are to include trading partner information;

receiving, by said first party, a request for said web service;

wherein said request was constructed, based on said description, to include particular trading partner information associated with business transactions between said first party and a second party;

wherein said particular trading partner information includes identification of said second party as a trading partner of said first party;

based on said particular trading partner information, determining whether said second party is an established trading partner of said first party;

if it is determined that said second party is an established trading partner of said first party, then based on said particular trading partner information, retrieving information about one or more agreements that govern business transactions between said first party and said second party; and servicing said request for said web service according to one or more of said agreements.

2. The method of claim 1, further comprising the computer-implemented steps of:

based on at least a portion of said particular trading partner information, determining whether said second party is an established trading partner of said first party; and if it is determined that said second party is an established trading partner of said first party, then accessing, based on said particular trading partner information, information about said second party.

3. A computer-readable medium carrying one or more sequences of instructions which, when executed by one or more processors, causes the one or more processors to perform the method recited in claim 2.

4. The method of claim 1, further comprising the computer-implemented steps of:

based on at least a portion of said particular trading partner information, determining whether said second party is an established trading partner of said first party;

based on at least a portion of said particular trading partner information, determining whether said second party is entitled to conduct said business transaction; and if it is determined that said second party is an established trading partner of said first party and that said second party is entitled to conduct said business transaction, then accessing, based on said particular trading partner information, information about said second party.

5. A computer-readable medium carrying one or more sequences of instructions which, when executed by one or more processors, causes the one or more processors to perform the method recited in claim 4.

6. The method of claim 1, further comprising the computer-implemented steps of:

based on at least a portion of said particular trading partner information, determining whether said second party is an established trading partner of said first party; and if it is determined that said second party is an established trading partner of said first party, then
accessing, based on said particular trading partner information, information about one or more agreements between said first party and said second party, wherein said agreements are associated with business processes between said first party and said second party, and servicing said request for said web service according to one or more of said agreements.

7. A computer-readable medium carrying one or more sequences of instructions which, when executed by one or more processors, causes the one or more processors to perform the method recited in claim 6.

8. The method of claim 1, wherein said description of said web service is represented in Web Services Description Language (WSDL).

9. A computer-readable medium carrying one or more sequences of instructions which, when executed by one or more processors, causes the one or more processors to perform the method recited in claim 8.

10. The method of claim 1, wherein said description of said web service is registered in a Universal Description, Discovery and Integration (UDDI) registry that is available to the public.

11. The method of claim 10, wherein said request was constructed based on information obtained by accessing said description from said registry and interpreting said description.

12. A computer-readable medium carrying one or more sequences of instructions which, when executed by one or more processors, causes the one or more processors to perform the method recited in claim 11.

13. A computer-readable medium carrying one or more sequences of instructions which, when executed by one or more processors, causes the one or more processors to perform the method recited in claim 10.

14. The method of claim 1, wherein said particular trading partner information is received in a SOAP message.

15. A computer-readable medium carrying one or more sequences of instructions which, when executed by one or more processors, causes the one or more processors to perform the method recited in claim 14.

16. The method of claim 1, wherein said particular trading partner information includes identification of a physical site that is associated with said second party from which said request is received.

17. A computer-readable medium carrying one or more sequences of instructions which, when executed by one or more processors, causes the one or more processors to perform the method recited in claim 16.

18. The method of claim 1, wherein said particular trading partner information includes identification of a type of party that characterizes said second party.

19. A computer-readable medium carrying one or more sequences of instructions which, when executed by one or more processors, causes the one or more processors to perform the method recited in claim 18.

20. The method of claim 1, wherein said particular trading partner information includes identification of a business purpose that is associated with said request.

21. A computer-readable medium carrying one or more sequences of instructions which, when executed by one or more processors, causes the one or more processors to perform the method recited in claim 20.

22. The method of claim 1, wherein said particular trading partner information includes a username and a password that are used by said first party to authenticate said second party as an established trading partner of said first party.

23. A computer-readable medium carrying one or more sequences of instructions which, when executed by one or more processors, causes the one or more processors to perform the method recited in claim 22.

24. A computer-readable medium carrying one or more sequences of instructions which, when executed by one or more processors, causes the one or more processors to perform the method recited in claim 1.

25. The method of claim 1, wherein said publicly-available description of said web service specifies requirements for becoming a trading partner of said first party.

26. A method for conducting a business-to-business transaction over a network using SOAP messaging, in which a first legacy application that is not designed to communicate with web services and that is associated with a first party communicates with a second application that is associated with a second party, the method comprising the computer-implemented steps of:

specifying in a publicly-available description of a web service, that at least some XML documents that are transmitted to said first legacy application as part of web service exchanges, are to include specific trading partner information;

receiving in a SOAP-based message from said second application, by said first legacy application, an XML document that is associated with a business-to-business transaction between said first party and said second party;

wherein said XML document was constructed, based on said description, to include identification of said second party as a trading partner of said first party;

based on said particular trading partner information, determining whether said second party is an established trading partner of said first party;

if it is determined that said second party is an established trading partner of said first party, then based on said particular trading partner information, retrieving information about agreements that govern business transactions between said first party and said second party; and servicing, by said first legacy application, said business-to-business transaction according to one or more of said agreements.

27. The method of claim 26, wherein said XML document received from said second application includes particular trading partner information, the method further comprising the computer-implemented steps of:

based on at least a portion of said particular trading partner information that is included in said XML document, accessing information about one or more processes used for business transactions between said first party and said second party; and replying, by said first legacy application, to said second application in response to said XML document and according to a process of the one or more processes.

28. A computer-readable medium carrying one or more sequences of instructions which, when executed by one or more processors, causes the one or more processors to perform the method recited in claim 27.

29. The method of claim 26, wherein said second application is a legacy application that is not designed to communicate with web services.

30. A computer-readable medium carrying one or more sequences of instructions which, when executed by one or more processors, causes the one or more processors to perform the method recited in claim 29.

31. The method of claim 26, wherein said description of said web service is represented in Web Services Description Language (WSDL).

32. A computer-readable medium carrying one or more sequences of instructions which, when executed by one or more processors, causes the one or more processors to perform the method recited in claim 31.

33. The method of claim 26, wherein said description of said web service is registered in a Universal Description, Discovery and Integration (UDDI) registry that is available to the public.

34. The method of claim 33, wherein said XML document was constructed based on information obtained by accessing said description from said registry and interpreting said description.

35. A computer-readable medium carrying one or more sequences of instructions which, when executed by one or more processors, causes the one or more processors to perform the method recited in claim 34.

36. A computer-readable medium carrying one or more sequences of instructions which, when executed by one or more processors, causes the one or more processors to perform the method recited in claim 26.

37. A computer-readable medium carrying one or more sequences of instructions which, when executed by one or more processors, causes the one or more processors to perform the method recited in claim 33.

38. The method of claim 26, wherein said publicly-available description of said web service specifies requirements for becoming a trading partner of said first party.

39. A method for conducting a business transaction over a network, the method comprising the computer-implemented steps of:

accessing, by a second party, from a publicly-available Universal Description, Discovery and Integration (UDDI) registry, a description of a web service that is provided by a first party, wherein said description includes a requirement that at least one communication to said web service is to include trading partner information;

determining from said description, by said second party, that at least one communication to said web service is to include trading partner information;

constructing, based on said description, a message to said web service that includes particular trading partner information according to said requirement;

wherein said particular trading partner information includes identification of said second party as a trading partner of said first party; and transmitting said message to said web service to allow said web service to:

determine, based on said particular trading partner information, whether said second party is an established trading partner of said first party;

if it is determined that said second party is an established trading partner of said first party, then based on said particular trading partner information, retrieve information about one or more agreements that govern business transactions between said first party and said second party; and service a request for said web service according to one or more of said agreements.

40. A computer-readable medium carrying one or more sequences of instructions which, when executed by one or more processors, causes the one or more processors to perform the method recited in claim 39.

* * * * *